United States Patent [19]

Ishiyama

[11] Patent Number: 5,370,376
[45] Date of Patent: Dec. 6, 1994

[54] LIQUID-CONTAINING TYPE VIBRATION ISOLATING APPARATUS

[75] Inventor: Tatsuro Ishiyama, Yokohama, Japan

[73] Assignee: Bridgestone Corporation, Tokyo, Japan

[21] Appl. No.: 205,048

[22] Filed: Mar. 2, 1994

[30] Foreign Application Priority Data

Mar. 5, 1993 [JP] Japan .................................. 5-045430

[51] Int. Cl.$^5$ .............................................. F16F 13/00
[52] U.S. Cl. .................................. 267/140.12; 267/219
[58] Field of Search ................. 267/140.12, 140.11, 267/219, 122, 140.13; 180/300, 312, 902; 248/562, 636, 638

[56] References Cited

U.S. PATENT DOCUMENTS

| 5,213,313 | 5/1993 | Tsutsumida et al. | 267/140.12 |
| 5,280,885 | 1/1994 | Noguchi | 267/140.12 |

Primary Examiner—Douglas C. Butler
Attorney, Agent, or Firm—Oliff & Berridge

[57] ABSTRACT

A liquid-containing type vibration isolating apparatus includes a first restricting passage, which connects a pressure-receiving liquid chamber and a first sub-liquid chamber and which is substantially U-shaped, and a longitudinal second restricting passage, which connects the pressure-receiving liquid chamber and a second sub-liquid chamber and which is provided at a substantially U-shaped inner side of the first restricting passage. The liquid-containing type vibration isolating apparatus can reliably absorb vibration of a wide range of frequencies and requires little space.

22 Claims, 18 Drawing Sheets

LIQUID-CONTAINING TYPE VIBRATION ISOLATING APPARATUS

BACKGROUND OF THE INVENTION

1. Field of the Invention

The present invention relates to a liquid-containing type vibration isolating apparatus which is mounted to a vehicle such as an automobile or to general industrial machines so as to absorb vibrations.

2. Description of the Related Art

A liquid-containing type vibration isolating apparatus, which can effectively absorb vibrations of different frequencies in accordance with respective vibrations, has been proposed.

As shown in FIGS. 17 and 18, a rubber main body 126 is disposed between an inner cylinder 112 and an outer cylinder 114 in a liquid-containing type vibration isolating apparatus 110. A liquid chamber is formed within the rubber main body 126.

In tile liquid chamber, a pressure-receiving liquid chamber 130, a second sub-liquid chamber 150 and a first sub-liquid chamber 146 are defined by a partitioning wall member 134 and a second diaphragm 144 so as to be disposed in layers in a radial direction. The pressure-receiving liquid chamber 130 is communicated with the first sub-liquid chamber 146 via a first restricting passage. The pressure-receiving liquid chamber 130 is also communicated with the second sub-liquid chamber 150 via a second restricting passage 120. The sectional area of the second restricting passage 120 is larger than that of the first restricting passage, and the length of the second restricting passage 120 is smaller than that of the first restricting passage. The second diaphragm 144 forms a partitioning wall between the first sub-liquid chamber 146 and the second sub-liquid chamber 150, and serves to expand and contract the second sub-liquid chamber 150. A thin first diaphragm 124 for expanding and contracting the first sub-liquid chamber 146 forms a portion of a partitioning wall of the first sub-liquid chamber 146.

When, for example, shake vibration having a low frequency and large amplitude (e.g., vibration having a frequency of about 5 to 20 Hz and an amplitude of about ±0.5 to ±1.0 mm) is inputted to the liquid-containing type vibration isolating apparatus 110, the filled liquid flows between the pressure-receiving liquid chamber 130 and the first sub-liquid chamber 146 via the first restricting passage. Liquid-column resonance of the liquid is generated in the first restricting passage, and a damping force (loss factor: tan δ) is generated in the liquid-containing type vibration isolating apparatus 110.

Further, when, for example, idle vibration having a relatively high frequency and small amplitude (e.g., vibration having a frequency of about 20 to 50 Hz and an amplitude of about ±0.1 to ±0.04 mm) is inputted to the liquid-containing type vibration isolating apparatus 110, the first restricting passage becomes clogged, and the filled liquid flows between the pressure-receiving liquid chamber 130 and the second sub-liquid chamber 146 via the second restricting passage 120. Liquid-column resonance of the liquid is generated in the second restricting passage 120, and a dynamic spring constant of the liquid-containing type vibration isolating apparatus 110 is decreased.

In the liquid-containing type vibration isolating apparatus 110, the pressure-receiving liquid chamber 130 and the plurality of sub-liquid chambers 146, 150 are disposed in layers on one side of the vibration isolating apparatus 110 relative to the inner cylinder 112. Because space is limited, the restricting passages which communicate between the pressure-receiving chamber 130 and the sub-liquid chambers 146, 150 must be disposed on the side opposite to these liquid chambers relative to the inner cylinder 112. As a result, the first restricting passage can only be allowed approximately half of tile length of the periphery of the liquid-containing type vibration isolating apparatus 110, viewed from a radial direction thereof. Further, there are limitations as to exerting a large damping force.

Since the pressure-receiving liquid chamber 130 and the plurality of sub-liquid chambers 146, 150 are disposed in layers on one side of the liquid-containing type vibration isolating apparatus 110 relative to the inner cylinder 112, the structure for defining the respective liquid chambers is complicated, and therefore, the number of parts increases.

In the liquid-containing type vibration isolating apparatus 110, the liquid chambers are disposed in layers. The first sub-liquid chamber 146 is formed at the thin first diaphragm 124 provided at the outer cylinder 114 and is able is formed at the thick second diaphragm 144 provided at the partitioning wall member 134, which defines the first sub-liquid chamber 146 and the second sub-liquid chamber, and is able to expand and contract. Vulcanization processes are necessary for a total of three rubber members including the rubber main body 126, the first diaphragm 124 of the outer cylinder 114 and the second diaphragm 144 of the partitioning wall member 134. Accordingly, there are many vulcanization steps, and the vibration isolating apparatus becomes costly.

Since the first-sub liquid chamber 146 and an air chamber 125 for expanding and contracting the first liquid chamber 146 are used for vibration having a low frequency and large amplitude, the first sub-liquid chamber 146 and the air chamber 125 require more space than the second sub-liquid chamber 150. In this type of vibration isolating apparatus, the plurality of liquid chambers are disposed in layers on one side of the apparatus relative to the inner cylinder. Consequently, the space for the first sub-liquid chamber 146 must be small, and a radial direction dimension (thickness) of the first sub-liquid chamber 146 becomes thin. As a result, a diaphragm of the first sub-liquid chamber 146 must be set close to an opposing wall surface or the like. Therefore, if a large load is applied to the vibration isolating apparatus (in a case in which the apparatus is used as an engine mount and the inner cylinder is displaced by a large amount, and for example, in a case in which torque is applied to the liquid-containing type vibration isolating apparatus 110 in a state in which a vehicle is accelerated or decelerated or when an automatic vehicle is stopped while in drive), the first diaphragm 124 may deform by a large amount and contact the opposing surface so as to make vibration difficult. There is a drawback in that adequate vibration reduction (a low dynamic spring constant caused by liquid-column resonance is necessary) cannot be obtained For low-frequency vibration.

In addition, there are cases in which the First diaphragm 124 may contact other vibrating diaphragms when high-frequency vibration is generated. In such cases, it is difficult for a diaphragm for high-frequency vibration to vibrate, and there is a drawback in that adequate vibration reduction (a low dynamic spring constant by the liquid-column resonance is necessary) cannot be obtained for high-frequency vibration. Further, there are cases in which the first diaphragm 124 expands a large amount at the outer cylinder 114 side and is pressed to the inner circumferential surface of the outer cylinder 114 (or a bracket disposed at the outer side of the outer cylinder 114). In this case, it becomes difficult for tile first sub-liquid chamber 146 to expand and contract, and consequently, it becomes difficult for the second sub-liquid chamber 150, which faces the first sub-liquid chamber 146 via the second diaphragm 144, to expand and contract. There is a drawback in that liquid-column resonance in the second restricting passage 120 lessens, and it is difficult for the high-frequency vibration to be absorbed.

SUMMARY OF THE INVENTION

In view of the aforementioned, an object of the present invention is to provide a liquid-containing type vibration isolating apparatus which can reliably absorb vibration of a wide range of frequencies and which requires only a small space.

The present invention is a liquid-containing type vibration isolating apparatus which absorbs and damps vibrations from a vibration generating portion comprising: an outer cylinder connected to one of the vibration generating portion and a vibration receiving portion; an inner cylinder provided at an inner side of said outer cylinder, and connected to another of the vibration generating portion and the vibration receiving portion; an elastic body provided between said inner cylinder and said outer cylinder, and deforming when vibration is generated; a pressure-receiving liquid chamber provided between said inner cylinder and said outer cylinder so that said elastic body is a portion of a partitioning wall; a first sub-liquid chamber which faces a first diaphragm provided at said outer cylinder, said first diaphragm receiving changes in liquid pressure and vibrating; a second sub-liquid chamber which faces a second diaphragm, said second diaphragm being formed so as to be more rigid than said first diaphragm and receiving changes in liquid pressure and vibrating; a first restricting passage which connects said pressure-receiving liquid chamber and said first sub-liquid chamber, said first restricting passage being formed by a pair of circumferentially-extending portions, which are separated by a predetermined distance in an axial direction and extend along a circumferential direction, and by a connecting portion, which connects respective circumferential direction end portions of said circumferentially-extending portions; and a second restricting passage which is shorter than said First restricting passage and connects said pressure-receiving liquid chamber and said second sub-liquid chamber, said second restricting passage being provided between said circumferentially-extending portions of said first restricting passage and extending along the circumferential direction.

In the liquid-containing type vibration isolating apparatus of the present invention, one of the inner cylinder and the outer cylinder is connected to the vibration generating portion, and another of the inner cylinder and the outer cylinder is connected to the vibration receiving portion.

When a vibration is inputted to the liquid-containing type vibration isolating apparatus, the elastic body deforms so that vibrations are absorbed by resistance based on internal friction of the elastic body.

In a case in which the inputted vibration is a vibration having a low frequency and large amplitude, a change in pressure in the pressure-receiving liquid chamber is transmitted to the first sub-liquid chamber via the first restricting passage. Consequently, the first diaphragm deforms and liquid moves reciprocally in the first restricting passage so as to generate liquid-column resonance. A large damping force is generated in the liquid-containing type vibration isolating apparatus so as to absorb the low-frequency vibration.

On the other hand, in a case in which the inputted vibration is a vibration having a high frequency and small amplitude, the first restricting passage is clogged. In this case, a change in pressure in the pressure-receiving liquid chamber is transmitted to the second sub-liquid chamber via the second restricting passage. Consequently, the second diaphragm deforms and liquid moves reciprocally in the second restricting passage so as to generate liquid-column resonance. The dynamic spring constant of the liquid-containing type vibration isolating apparatus is decreased.

The liquid-containing type vibration isolating apparatus of the present invention may be structured such that, for example, when viewing an axial direction cross section thereof, the pressure-receiving liquid chamber and the first sub-liquid chamber are disposed at one side of the vibration isolating apparatus relative to the inner cylinder, and the first restricting passage can be disposed only at the side opposite to the pressure-receiving liquid chamber and the first sub-liquid chamber relative to the inner cylinder. Even in this case, the total length of the first restricting passage can be made large because the first restricting passage is formed by a pair of circumferentially-extending portions, which are separated by a predetermined distance in an axial direction and extend along a circumferential direction, and by a curved connecting portion, which connects respective ones of circumferential direction end portions of the circumferentially-extending portions. Therefore, large liquid-column resonance can be generated when a low-frequency vibration is inputted.

Moreover, since the second restricting passage is disposed between the circumferentially-extending portions of the first restricting passage, space is used effectively and the liquid-containing type vibration isolating apparatus is made compact.

Further, since the second sub-liquid chamber is separated from the first sub-liquid chamber, the first diaphragm provided at the first sub-liquid chamber can be separated by an adequate distance from an opposing surface, for example, a wall surface of the first sub-liquid chamber or that of an air chamber opposite to the first sub-liquid chamber. As a result, the first diaphragm can be prevented from contacting other members.

In addition, the second diaphragm provided at the second sub-liquid chamber does not contact the first diaphragm.

As explained hereinbefore, because the liquid-containing type vibration isolating apparatus of the present invention is structured as described above, a superior effect can be achieved in that the vibration isolating apparatus can reliably absorb vibration of a wide range of frequencies and requires little space.

DESCRIPTION OF THE PREFERRED EMBODIMENTS

First Embodiment

A liquid-containing type vibration isolating apparatus 10 relating to a first embodiment of the present invention will be described in accordance with FIGS. 1 through 5.

Figure 1:
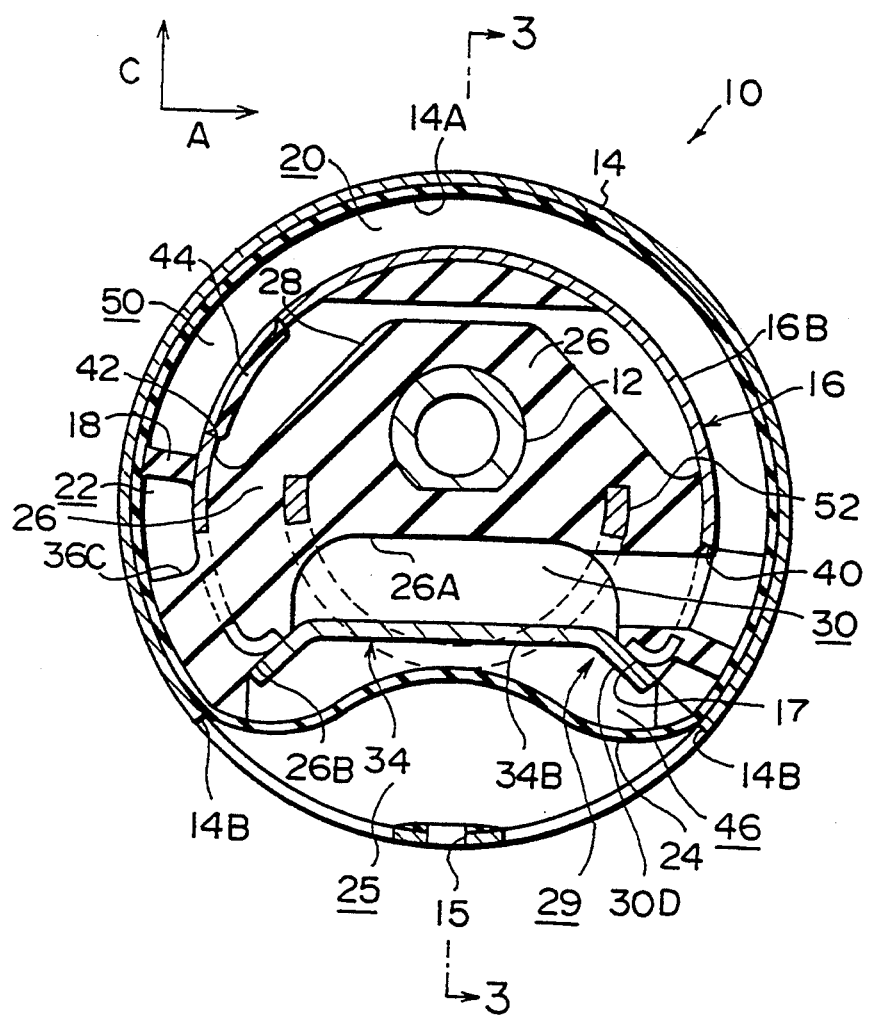
FIG. 1 is a sectional view of a liquid-containing type vibration isolating apparatus relating to a first embodiment of the present invention, the view being orthogonal to an axis of the liquid-containing type vibration isolating apparatus.
Figure 3:
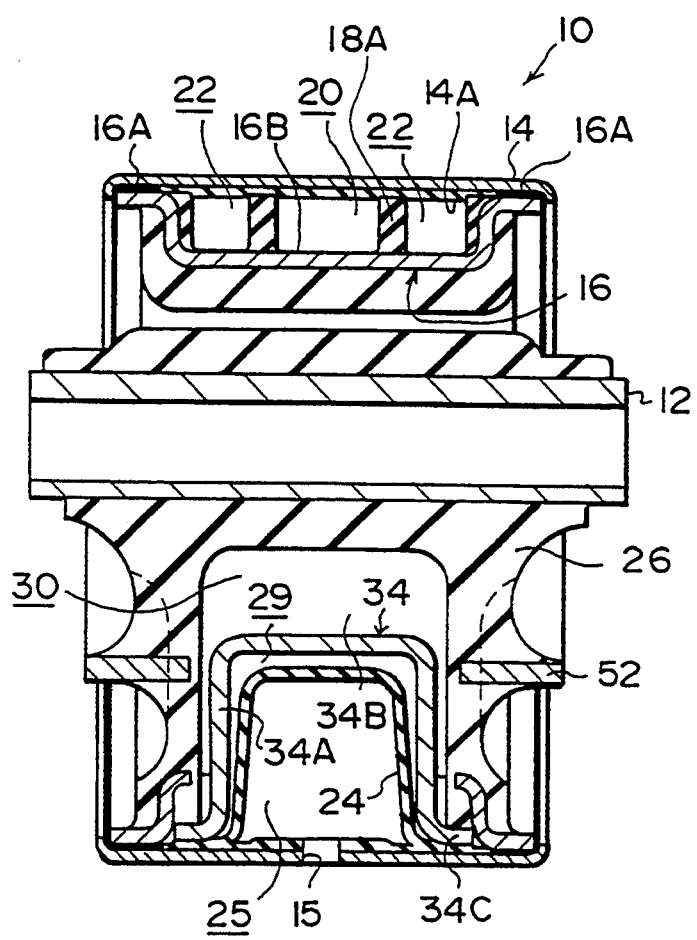
FIG. 3 is a sectional view, taken along line 3—3 of FIG. 1, of the liquid-containing type vibration isolating apparatus relating to the first embodiment of the present invention.
Figure 3:
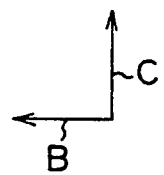

As shown in FIGS. 1 and 3, an inner cylinder 12 and an outer cylinder 14 are disposed in the same axial direction in the liquid-containing type vibration isolating apparatus 10. An intermediate cylinder 16 is provided between the inner cylinder 12 and the outer cylinder 14 and is coaxially disposed with the outer cylinder 14. The intermediate cylinder 16 is formed by drawing or press-molding a metal pipe, a metal plate or the like.

Figure 2:
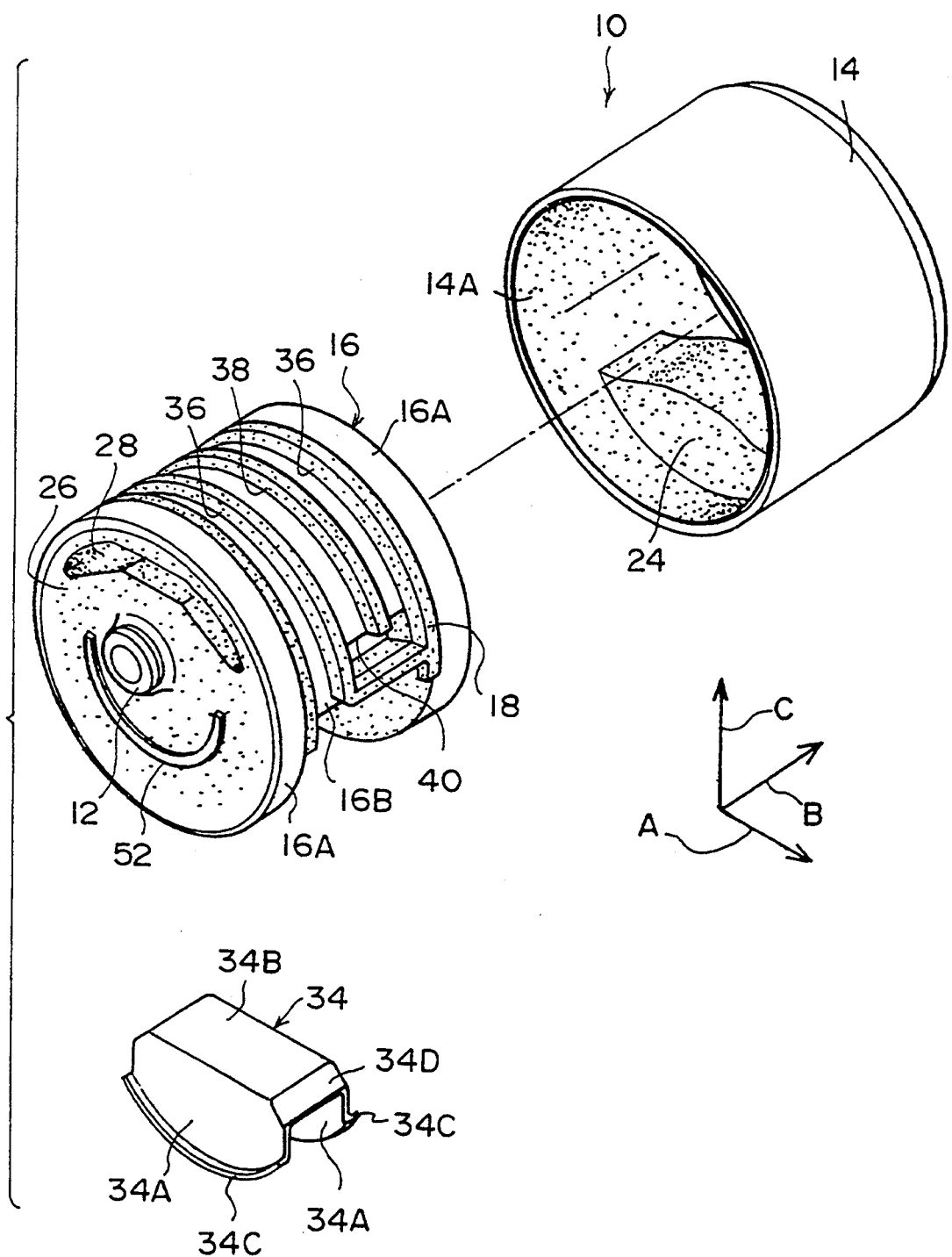
FIG. 2 is an exploded perspective view of the liquid-containing type vibration isolating apparatus relating to the first embodiment of the present invention.

As shown in FIGS. 2 and 3, a small diameter portion 16B is formed in an intermediate portion of the intermediate cylinder 16 in an axial direction thereof. Large diameter portions 16A are formed at both end portions of the small diameter portion 16B in the axial direction thereof. The outer peripheral surface of tile intermediate cylinder 16 is pressed and contacted by a thin film rubber 14A which is bonded by vulcanization to an inner circumferential surface of the outer cylinder 14.

Since the thin film rubber 14A is exposed to outside air, a highly ozone-resistant rubber material is used.

As shown in FIG. 3, both axial direction end portions of the outer cylinder 14 have reduced diameters and are caulked so as to fix the intermediate cylinder 16 to the outer cylinder 14.

As shown in FIGS. 1 through 3, a rubber main body 26, which is formed as an elastic body, is disposed between the inner cylinder 12 and the intermediate cylinder 16. The rubber main body 26 is bonded by vulcanization to the inner cylinder 12 and the intermediate cylinder 16, respectively. A rubber material having a small loss is used for the rubber main body 26.

A pair of through-holes 14B are formed in the lower side of the outer cylinder 14. The thin film rubber 14A is not bonded by vulcanization to a portion corresponding to the through-holes 14B off the outer cylinder 14. This non-bonded portion of the thin film rubber 14A becomes a first diaphragm 24 which is convex in the direction of the inner cylinder 12.

An air chamber 25 is formed between the outer cylinder 14 and the first diaphragm 24, and is communicated with the outside air via an air hole 15 of the outer cylinder 14.

As shown in FIGS. 1 and 2, an air gap portion 28, which penetrates through the rubber main body 26 in the axial direction of the liquid-containing type vibration isolating apparatus 10, is formed in the upper side (the side of the direction of arrow C) of the inner cylinder 12.

As shown in FIGS. 1 and 3, a concave portion 26A, which is cut out by a large amount in the direction of the inner cylinder 12, is formed in the rubber main body 26 on the side opposite to the air gap portion 28 so that the inner cylinder 28 is disposed therebetween. The concave portion 26A has step portions 26B. The step portions 26B are respectively formed in intermediate portions of the side walls of the end portions of the concave portion 26A, as viewed from the axial direction (see FIG. 1).

The concave portion 26A forms a liquid chamber 29. The liquid chamber 29 is closed by the first diaphragm 24 and the thin film rubber film 14A, and is filled with a liquid such as water or oil.

A partitioning wall member 34, which partitions the liquid chamber 29 into two chambers in a radial direction, is disposed in the liquid chamber 29. As illustrated in FIGS. 1 and 2, a pair of side plate portions 34A, which are each formed in a substantially semicircular shape and whose longitudinal direction end portions are cut out, are provided at the partitioning wall member 34 so as to oppose each other. A rectangular top plate portion 34B is provided at a linear portion of the side plate portions 34A so as to be continuous with the side plate portions 34A. Inclined portions 34D, which slant downwardly, are provided at both end portions of the top plate portion 34B. A bent flange portion 34C is formed continuously with the edge portion of the side plate portion 34A. As illustrated in FIG. 3, a cross section of the partitioning wall member 34 along an axis is substantially hat-shaped.

The outer peripheral surfaces of the flange portions 34C of the partitioning wall member 34 on the outer cylinder 14 side are fit to the thin film rubber 14A. The inclined portions 34D of the top plate portion 34B and the respective end portions in the longitudinal direction of the side plate portions 34A are fit to the rubber main body 26. Accordingly, the liquid chamber 29 is partitioned into two chambers, that is, a pressure-receiving liquid chamber 30, which is formed on the inner cylinder 12 side of the partitioning wall member 34, and a first sub-liquid chamber 46, which is formed between the partitioning wall member 34 and the outer cylinder 14.

As shown in FIG. 2, a restricting passage forming rubber 18 is bonded by vulcanization to the small diameter portion 16B of the intermediate cylinder 16. The restricting passage forming rubber 18 is bonded by vulcanization to the intermediate cylinder 16 at the same time that the rubber main body 26 is vulcanized. In the present embodiment, the material of the restricting passage forming rubber 18 is the same as that of the rubber main body 26. The restricting passage forming rubber 18 is connected to a portion of the rubber main body 26.

A narrow groove 36 and a wide groove 38 are formed in the restricting passage forming rubber 18. The restricting passage, which includes the narrow groove 36 and the wide groove 38, will be described hereinafter.

Figure 4:
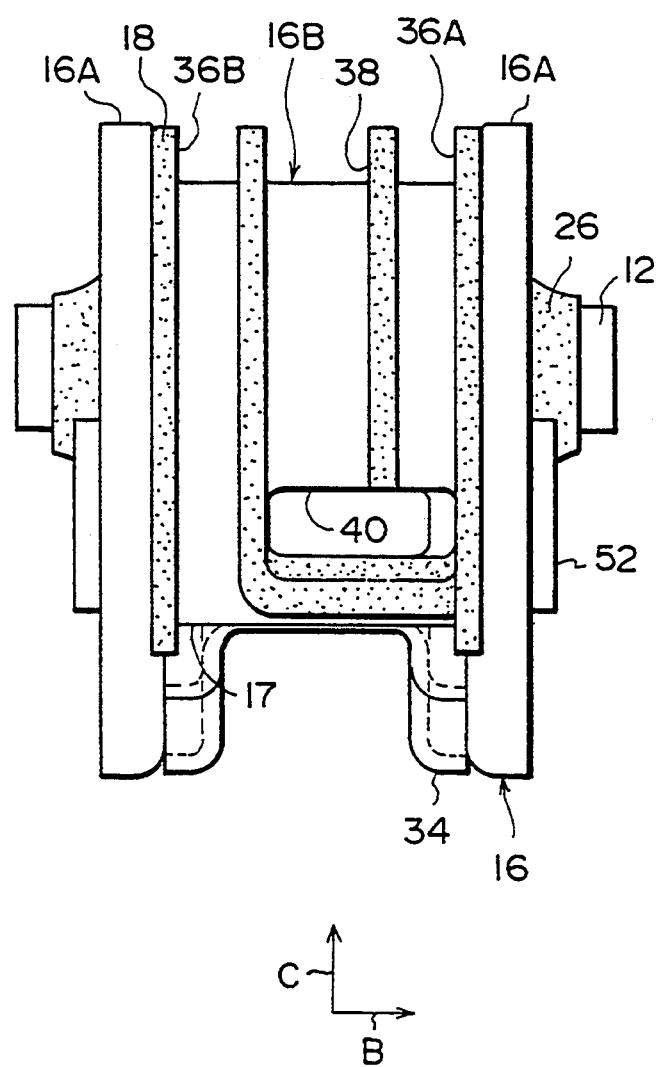
FIG. 4 is a right side view of an intermediate cylinder of the liquid-containing type vibration isolating apparatus relating to the first embodiment of the present invention.
Figure 5:
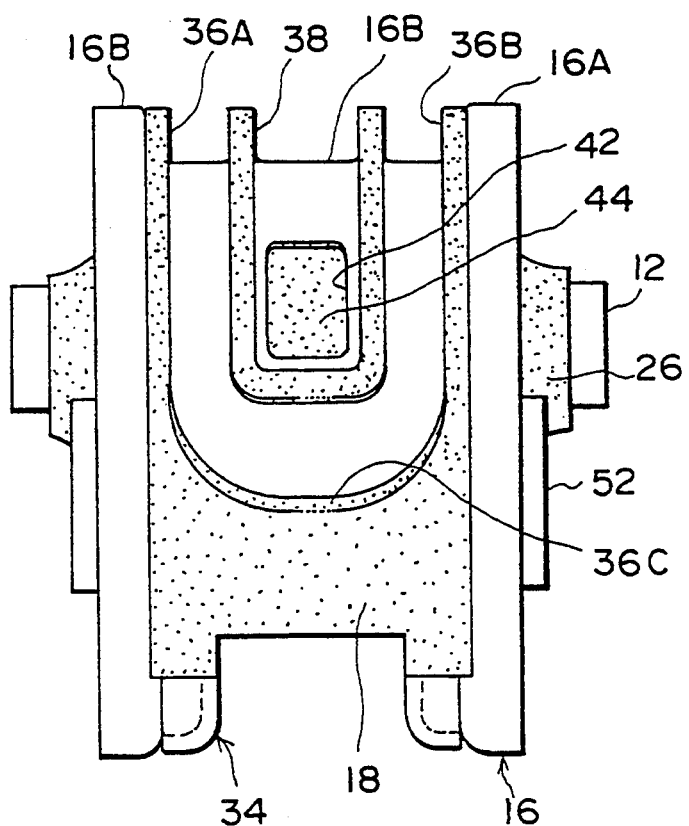
FIG. 5 is a left side view of the intermediate cylinder of the liquid-containing type vibration isolating apparatus relating to the first embodiment of the present invention.
Figure 5:
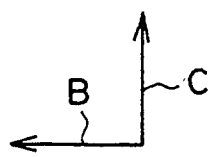

As shown in FIGS. 2, 4 and 5, the narrow groove 36 is formed by a first linear groove portion 36A, a second linear groove portion 36B and an arc-shaped groove portion 36C. The first linear groove portion 36A is disposed on one side (tile side in the direction of arrow B) in the axial direction and is formed along the circumferential direction. The first linear groove portion 36A serves as a circumferentially-extending portion. The second linear groove portion 36B is disposed on the other side (the side in the direction opposite arrow B) in the axial direction and is formed along the circumferential direction. The second linear groove portion 36B serves as a circumferentially-extending portion. The arc-shaped groove portion 36C is disposed on one side (the side in the direction opposite arrow A) in the radial direction and serves as a curved connecting portion.

The radius of curvature of the arc-shaped groove portion 36C, which connects one end portion of the first linear groove portion 36A and one end portion of the second linear groove portion 36B, is made large. The entire narrow groove 36, as viewed from the exterior, is formed in a substantially U-shape. When the curvature of the arc-shaped groove portion 36C is made small, the transit resistance is large when liquid flows in the arc-shaped groove portion 36C. Therefore, it is preferable to set the curvature as large as possible.

As illustrated in FIG. 4, one end portion of the wide groove 38 and the other end portion of the first linear groove portion 36A are connected to a rectangular hole 40. The rectangular hole 40 is formed in a vicinity of a rectangular hole 17 which is provided in the lower side of the small diameter portion 16B. As shown in FIG. 1, the rectangular hole 40 further penetrates through the rubber main body 26 and reaches a side wall of the concave portion 26A.

In addition, as shown in FIG. 4, the other end portion of the second linear groove portion 36B ends at an end portion of the rectangular hole 17. The narrow groove 36 is connected to the end portion of the concave portion 26A near the outer cylinder 14 (outwardly of the partitioning wall member 34).

On the other hand, the wide groove 38 is disposed between the first linear groove portion 36A and the second linear groove portion 36B, and extends along the circumferential direction. One end of the wide groove 38 is connected to the rectangular hole 40, and the other end of the wide groove 38 ends in a vicinity of the arc-shaped groove portion 36C. A rectangular hole 42 is formed in the small diameter portion 16B of the intermediate cylinder 16 in a direction of the air gap portion 28. The rectangular hole 42 faces the other end portion of the wide groove 38. The rectangular hole 42 is closed by a thick second diaphragm 44.

The second diaphragm 44 is bonded by vulcanization to the intermediate cylinder 16 at the same time that the rubber main body 26 is bonded by vulcanization to the intermediate cylinder 16 and the inner cylinder 12. In the present embodiment, the material of the second diaphragm 44 is the same as that of the rubber main body 26. Since the second diaphragm 44 is exposed to outside air, it is preferable to use rubber which is highly resistant to ozone (in this case, the material of the second diaphragm 44 may be different from that of tile rubber main body 26).

The second diaphragm 44 is thicker than the first diaphragm 24, and is more rigid than tile first diaphragm 24 with respect to liquid pressure.

As shown in FIGS. 1 and 3, the outer peripheral surfaces of the large diameter portions 16A of the intermediate cylinder 16 and the restricting passage forming rubber 18A are pressed and contacted by the thin film rubber 14A. The narrow groove 36 is enclosed by the outer cylinder 14, and forms a first restricting passage 22 for absorbing low-frequency vibration such as shake vibration or the like. The wide groove 38 is enclosed by the outer cylinder 14, and forms a second restricting passage 20 for absorbing high-frequency vibration such as idle vibration or the like.

Here, a periphery of the other end portion of the second restricting passage 20 (a periphery of the other end portion of the wide groove 38), which faces the second diaphragm 44, serves as a second sub-liquid chamber 50.

As shown in FIG. 1, a restraining plate 52, having a substantially arc-shaped cross section, is embedded in the rubber main body 26 so as to surround the pressure-receiving liquid chamber 30. The restraining plate 52 adjusts the rigidity of the rubber main body 26 so as to limit the amount of deformation thereof.

Next, operation of the present embodiment will be explained.

In a case in which the liquid-containing type vibration isolating apparatus 10 is mounted to an automobile as an engine mount in the automobile, for example, the outer cylinder 14 is connected to a vehicle body of the automobile via an unillustrated bracket, and the inner cylinder 12 is fixed to the engine via an unillustrated connecting rod. Here, load of the engine is in a direction opposite to the direction of arrow C. The inner cylinder 12, to which the tare of the engine is applied, elastically deforms the rubber main body 26 and moves closer to the partitioning wall member 34 than the position in FIG. 1 so as to be disposed substantially coaxially with the outer cylinder 14. As a result, the air gap portion 28 expands in vertical directions.

Note that, in an opposite manner to the case described above, a vehicle body of an automobile may be connected to the inner cylinder 12, while an engine may be connected to the outer cylinder 14.

When an engine vibration is inputted to the liquid-containing type vibration isolating apparatus 10, the rubber main body 26 deforms so that the liquid pressure within the pressure-receiving liquid chamber 30 fluctuates.

In a case in which an engine vibration is a vibration having a low frequency and large amplitude, for example, shake vibration (e.g., vibration having a frequency of about 5 to 20 Hz and an amplitude of about ±0.5 to ±1.0 mm), the first diaphragm 24, which has low rigidity and faces the first sub-liquid chamber 46, deforms by a large amount due to the changes in the liquid pressure. As a result, liquid-column resonance of the liquid is generated in the first restricting passage 22, which has a smaller sectional area, and a large damping force is generated in the liquid-containing type vibration isolating apparatus 10. In the present embodiment, the longitudinal dimension of the first restricting passage 22 is made longer than that of a conventional liquid-containing type vibration isolating apparatus of this type (length of the first restricting passage 22 is twice as long as that of the conventional apparatus because the first restricting passage runs forward and backward along the circumferential direction). Accordingly, liquid-column resonance of the liquid in the first restricting passage 22 is great, and a larger damping force is generated in the liquid-containing type vibration isolating apparatus 10 than in the conventional apparatus.

Note that the second diaphragm 44 receives the changes in liquid pressure, which are caused by vibration which has a low frequency and large amplitude, at the same time that the first diaphragm 24 receives them. However, the second diaphragm 44 hardly deforms because of its high rigidity.

On the other hand, in a case in which the engine vibration is a vibration having a high frequency and small amplitude, for example, idle vibration (e.g., a vibration having a frequency of about 20 to 50 Hz and an amplitude of about ±0.1 to ±0.04 mm), the first restricting passage 22, which has a small sectional area, becomes clogged. At this time, the second diaphragm 44 deforms so that liquid-column resonance of the liquid is generated in the second restricting passage 20. The dynamic spring constant of the liquid-containing type vibration isolating apparatus 10 is decreased, and the high-frequency vibration such as idle vibration or the like is absorbed.

In the present embodiment, the respective volumes of the first sub-liquid chamber 46 and the air chamber 25 are increased because the second sub-liquid chamber 50 is not adjacent to the first sub-liquid chamber 46. Since there is sufficient space between the first diaphragm 24 and the opposing surface, even if a large pressure is applied to the first diaphragm 24 (a case in which the inner cylinder 12 is displaced by a large amount, and for example, a case in which torque is applied to the liquid-containing type vibration isolating apparatus when a vehicle accelerates or decelerates or when an automatic vehicle stops while in drive), the first diaphragm 24 does not contact other members (For example, the first diaphragm 24 does not cave in so as to contact the partitioning wall member 34, and does not expand so as to contact the outer cylinder 14 and the like). Therefore, even if a low-frequency vibration is inputted in a state in which the first diaphragm 24 receives a large pressure from the pressure-receiving liquid chamber 30, the first diaphragm 24 can reliably absorb the low-frequency vibration. Moreover, since the second diaphragm 44 of the second sub-liquid chamber 50 is isolated from the first diaphragm 24, the second diaphragm 44 is not effected by the first diaphragm 24 and can reliably vibrate when the high-frequency vibration occurs.

In the conventional liquid-containing type vibration isolating apparatus, since a first sub-liquid chamber and a second sub-liquid chamber are partitioned by a partitioning wall member, there is a drawback in that liquid leaks between the first sub-liquid chamber and the second sub-liquid chamber. However, in the liquid-containing type vibration isolating apparatus 10 of the present invention, since the first sub-liquid chamber 46 and the second sub-liquid chamber 50 are isolated from each other, liquid does not move reciprocally between the first sub-liquid chamber 46 and the second sub-liquid chamber 50 and the vibration isolating characteristic is not changed due to leakage of the liquid.

In the liquid-containing type vibration isolating apparatus 10 of the present invention, the second diaphragm 44 is vulcanized at the same time that the rubber main body 26 is vulcanized. Conventionally, three vulcanization processes are necessary: a process for vulcanizing a first diaphragm to an outer cylinder; a process for vulcanizing a rubber main body to an intermediate cylinder and an inner cylinder; and a process for vulcanizing a second diaphragm to a partitioning wall member. However, in the present invention, only two vulcanization processes are necessary. Consequently, manufacturing processes are simplified, and the number of assembly parts (diaphragms) is reduced. Therefore, the liquid-containing type vibration isolating apparatus of the present invention can be manufactured less expensively than the conventional apparatus.

Second Embodiment

Next, a second embodiment of the present invention will be described in accordance with FIG. 6. The second embodiment is a variant example of the first embodiment. Structures similar to those of the first embodiment are designated by the same reference numerals, and descriptions thereof are omitted.

Figure 6:
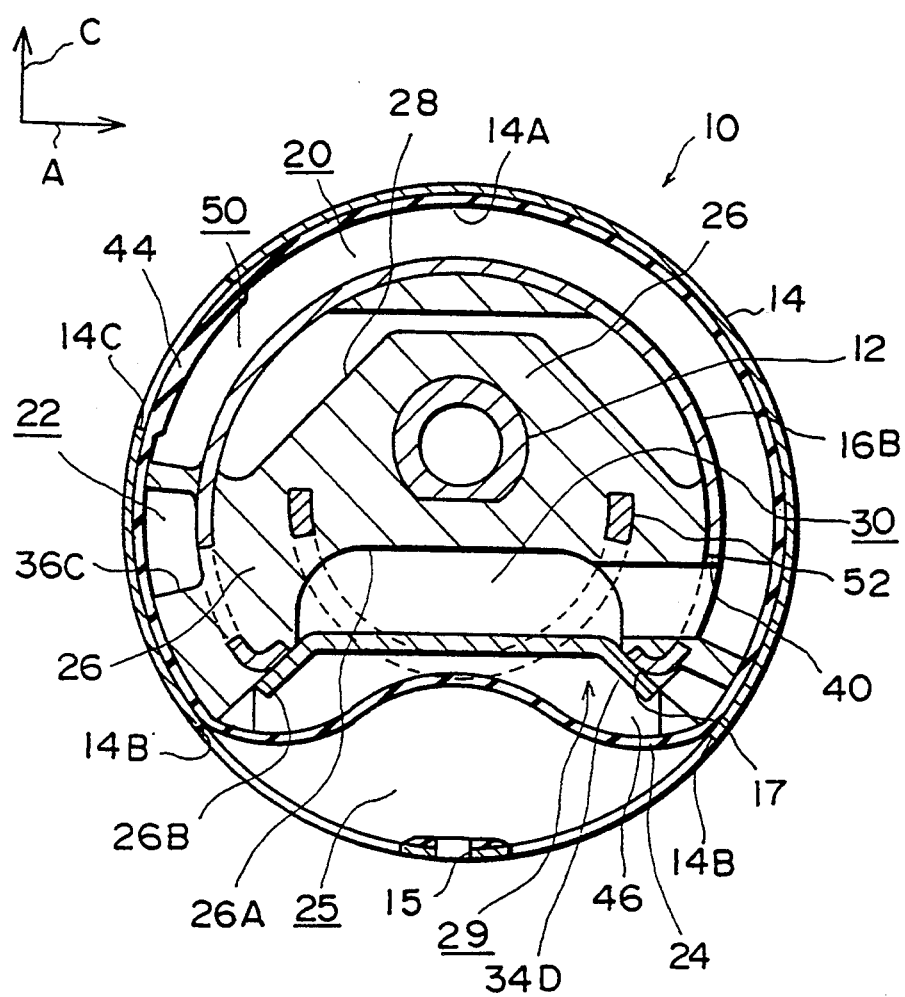
FIG. 6 is a sectional view of a liquid-containing type vibration isolating apparatus relating to a second embodiment of the present invention, the view being orthogonal to an axis of the liquid-containing type vibration isolating apparatus.

As shown in FIG. 6, in the liquid-containing type vibration isolating apparatus 10 of tile second embodiment, a hole 14C is formed in tile outer cylinder 14, and the second diaphragm 44 is provided In the hole 14C.

Similarly to the first embodiment, the second diaphragm 44 is thicker than the first diaphragm 24 and is more rigid than the first diaphragm 24 with respect to liquid pressure. Since, similarly to the first diaphragm 24, the second diaphragm 44 of the second embodiment is formed by a portion of the thin film rubber 14A, the second diaphragm 44 is highly resistant to ozone.

Note that the other structures and operation are the same as those of the first embodiment.

Third Embodiment

Next, a third embodiment of the present invention will be described in accordance with FIG. 7. The third embodiment is a variant example of the second embodiment. Structures similar to those of the first and second embodiments are designated by the same reference numerals, and descriptions thereof are omitted.

Figure 7:
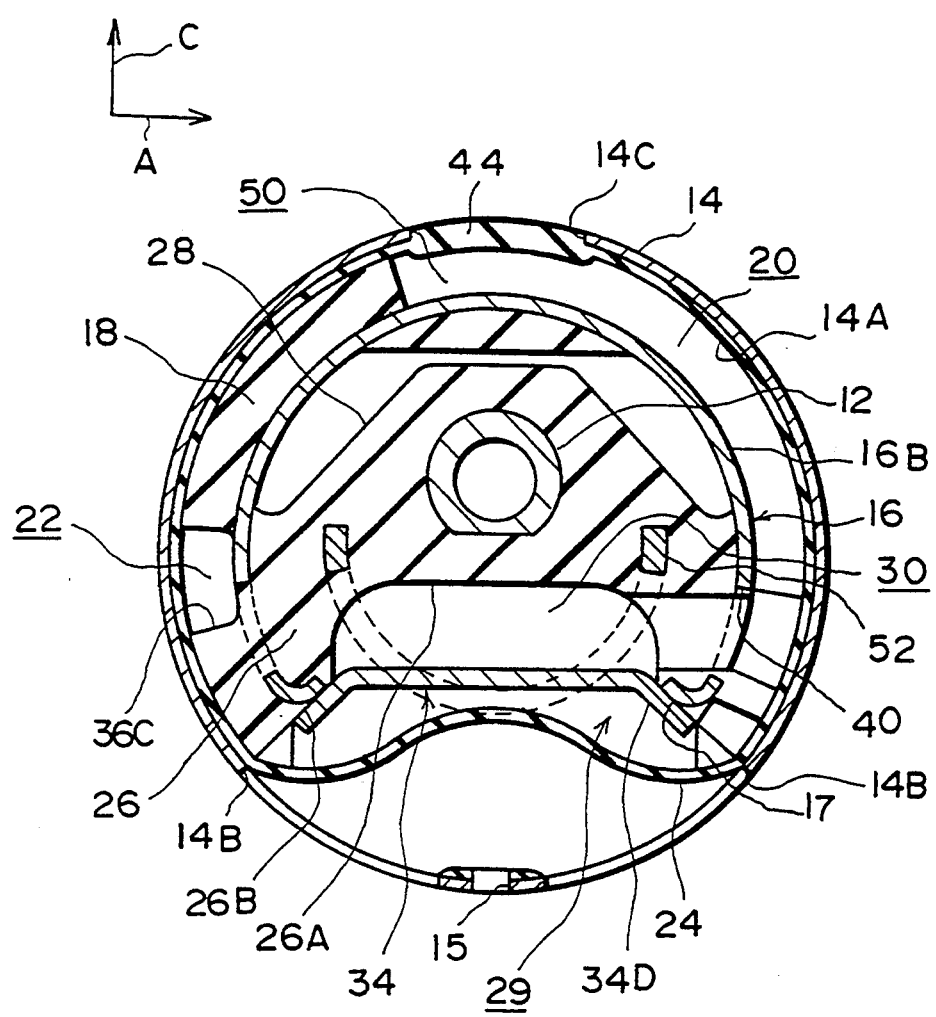
FIG. 7 is a sectional view of a liquid-containing type vibration isolating apparatus relating to a third embodiment of the present invention, the view being orthogonal to an axis of the liquid-containing type vibration isolating apparatus.
Figure 8:
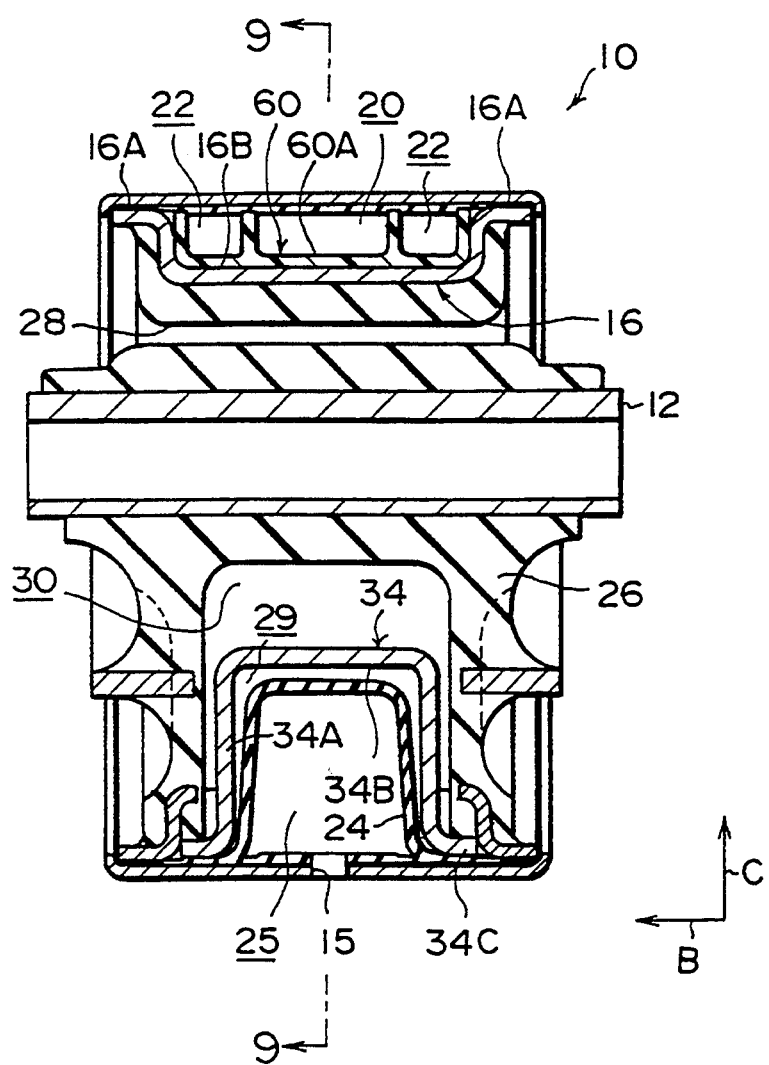
FIG. 8 is a sectional view of a liquid-containing type vibration isolating apparatus relating to a fourth embodiment of the present invention, the view being along an axis of the liquid-containing type vibration isolating apparatus.
Figure 9:
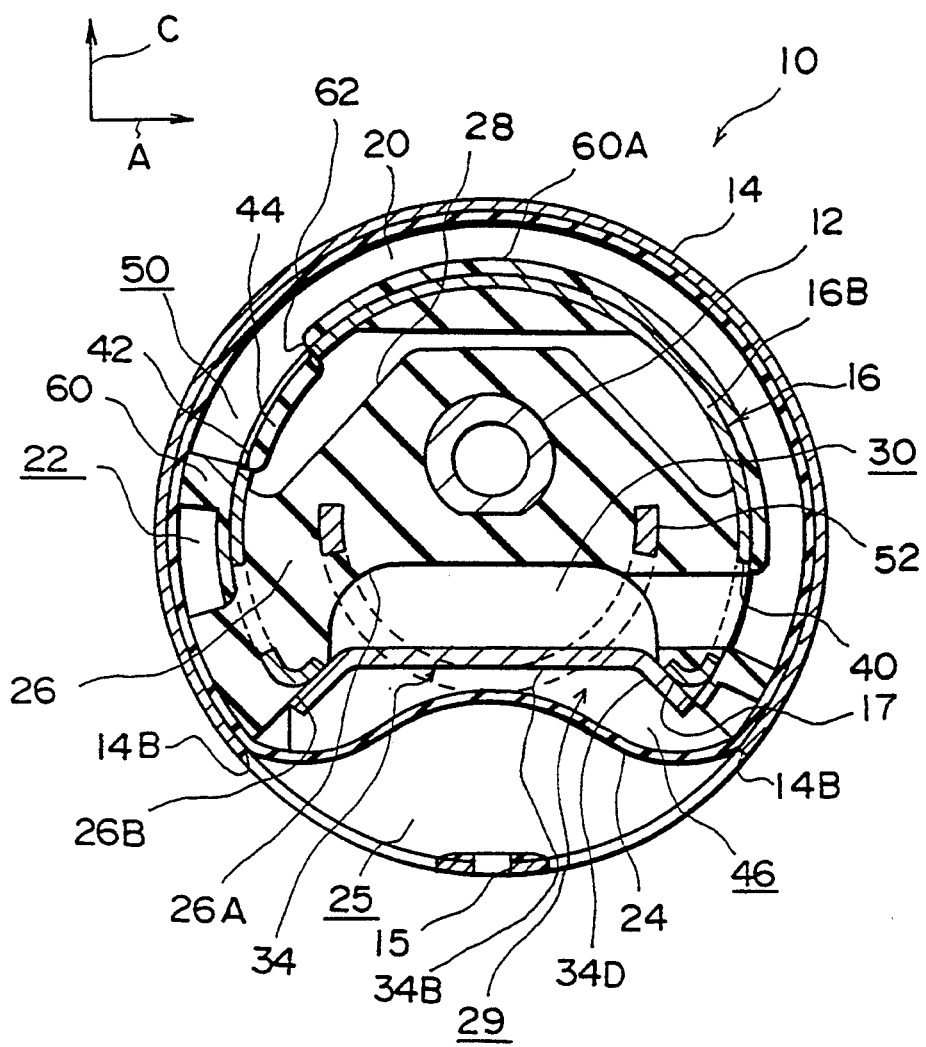
FIG. 9 is a sectional view, taken along line 9—9 of FIG. 8, of tile liquid-containing type vibration isolating apparatus relating to the fourth embodiment of the present invention.
Figure 10:
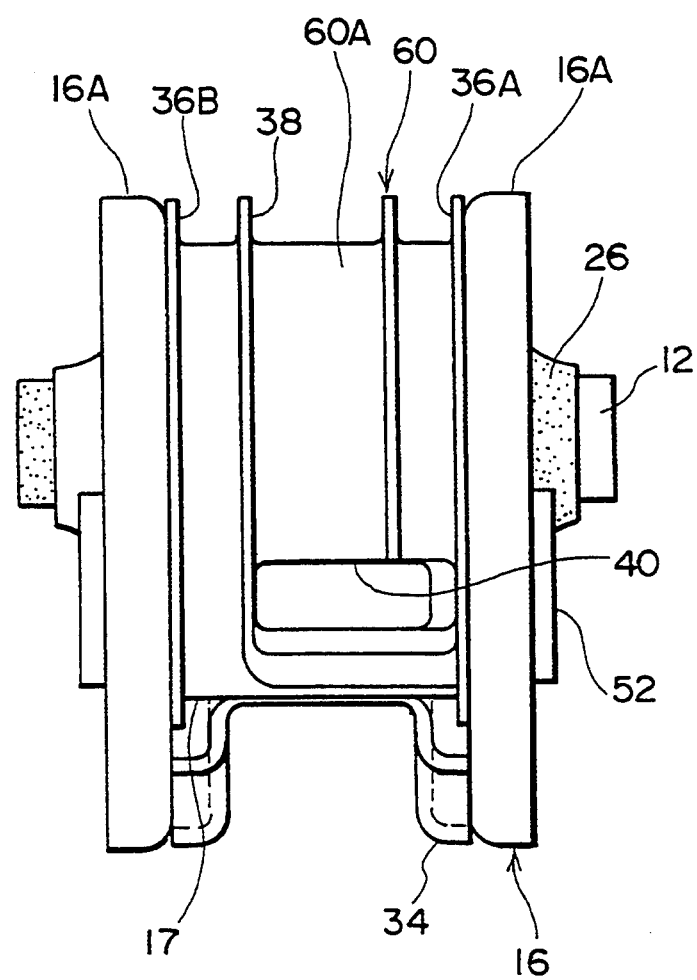
FIG. 10 is a right side view of an intermediate cylinder of the liquid-containing type vibration isolating apparatus relating to the fourth embodiment of the present invention.
Figure 11:
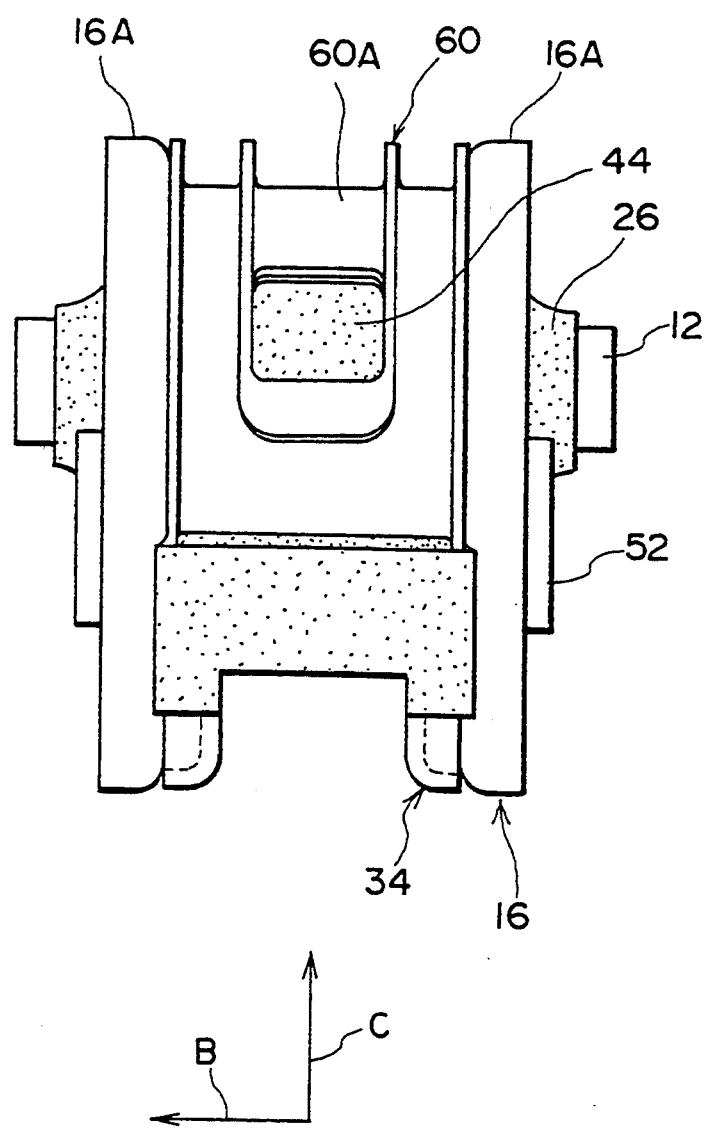
FIG. 11 is a left side view of the intermediate cylinder of the liquid-containing type vibration isolating apparatus relating to the fourth embodiment of the present invention.

As shown in FIG. 7, in a liquid-containing type vibration isolating apparatus 10 of the third embodiment, the second diaphragm 44, which is thicker than the second diaphragm 44 of the second embodiment, is provided on the upper side of the outer cylinder 14 (i.e., on the side in the direction of arrow C and on a line which passes through the center of the recessed portion 26A and the axial center off the inner cylinder 12). The second restricting passage 20 is shorter than tile second restricting passage 20 of the second embodiment.

In the third embodiment, because of this structure, the liquid-containing type vibration isolating apparatus 10 can absorb vibration of a higher frequency than the vibration absorbed by the structure of the second embodiment.

In the third embodiment, as shown in FIG. 7, since the outer cylinder 14 is symmetrical with respect to an axis passing through the center of the recessed portion 26A and the axial center of the inner cylinder 12, it is not necessary to distinguish between left and right when assembling the intermediate cylinder 16. Consequently, assembly becomes easier.

Note that the other structures and operation are the same as those of the first embodiment.

Fourth Embodiment

Next, a fourth embodiment of the present invention will be described in accordance with FIGS. 8 through 11. The fourth embodiment is a variant example of the first embodiment. Structures similar to those of the first embodiment are designated by the same reference numerals, and descriptions thereof are omitted.

As shown in FIGS. 8 through 11, in the liquid-containing type vibration isolating apparatus 10 of tile fourth embodiment, instead of the restricting passage forming rubber 18 off the first embodiment, a restricting passage forming member 60 (e.g., a product formed from aluminum alloy die-cast and resin) which is formed of a hard material (e.g., an aluminum alloy, resin or the like) is fit into the small diameter portion 16B of the intermediate cylinder 16. The restricting passage forming member 60 has a bottom plate 60A which is fit to the small diameter portion 16B. The side wall portions of the bottom plate 60A, the narrow grooves 36A and 36B, and the wide groove 38 are thin. A relief hole 62 is formed in the bottom plate 60A at a portion corresponding to the rectangular hole 42 of the intermediate cylinder 16.

In the fourth embodiment, since the restricting passage forming member 60 is formed of a hard material, the first restricting passage 22 and the second restricting passage 20 are not deformed by changes in liquid pressure. Changes in the vibration isolating characteristic due to the deformation of the first restricting passage 22 and the second restricting passage 20 can thereby be prevented.

Moreover, by forming the restricting passage forming member 60 of a hard material, tile wall surfaces of the first restricting passage 22 and the second restricting passage 20 can be made thinner. In a case in which the sectional areas of the passages are the same, the vibration isolating apparatus can be made even more compact. In a case in which sizes of the vibration isolating apparatuses are the same, the sectional areas of the respective restricting passages can be made larger.

Note that the other structures and operation are the same as those of the first embodiment.

Fifth Embodiment

Next, a fifth embodiment of tile present invention will be described in accordance with FIG. 12. The fifth embodiment is a variant example of the fourth embodiment. Structures similar to those of the first and fourth embodiments are designated by the same reference numerals, and descriptions thereof are omitted.

Figure 12:
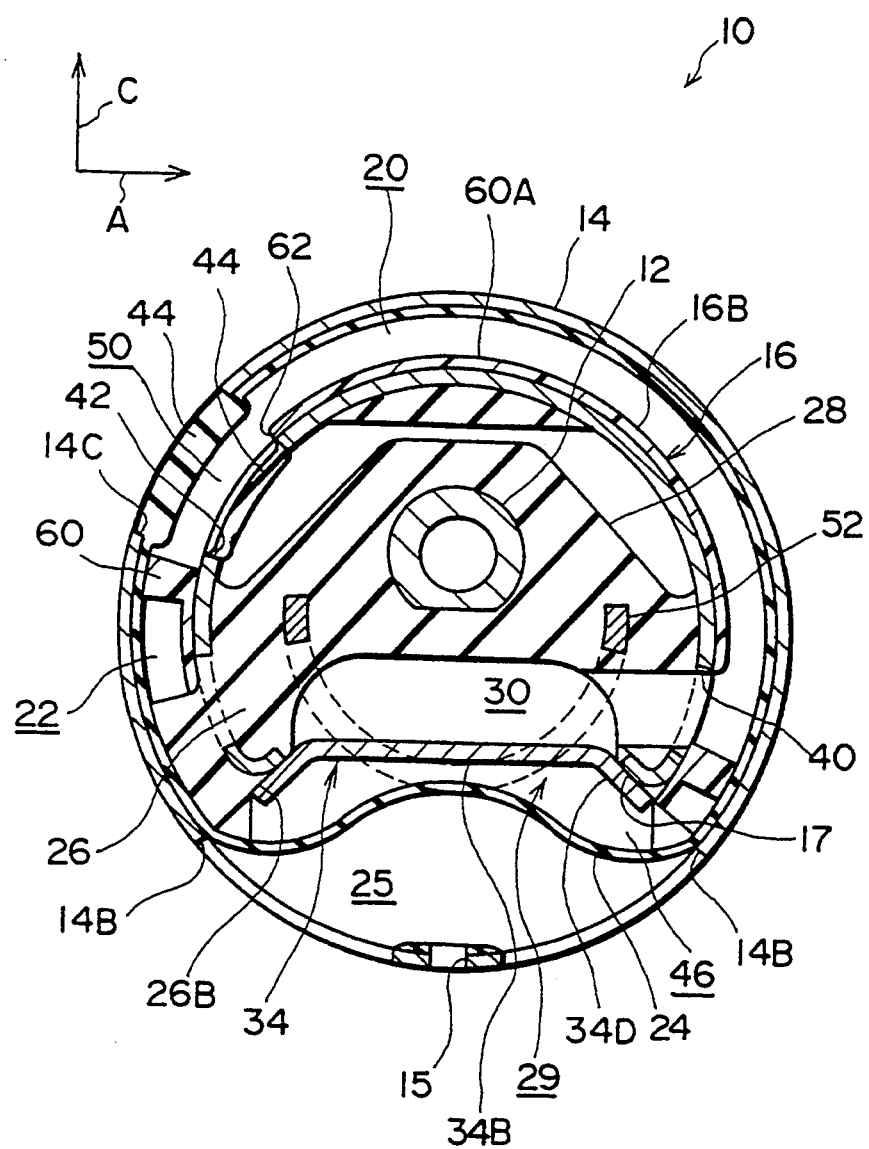
FIG. 12 is a sectional view of a liquid-containing type vibration isolating apparatus relating to a fifth embodiment of the present invention, the view being orthogonal to an axis of the liquid-containing type vibration isolating apparatus.
Figure 13:
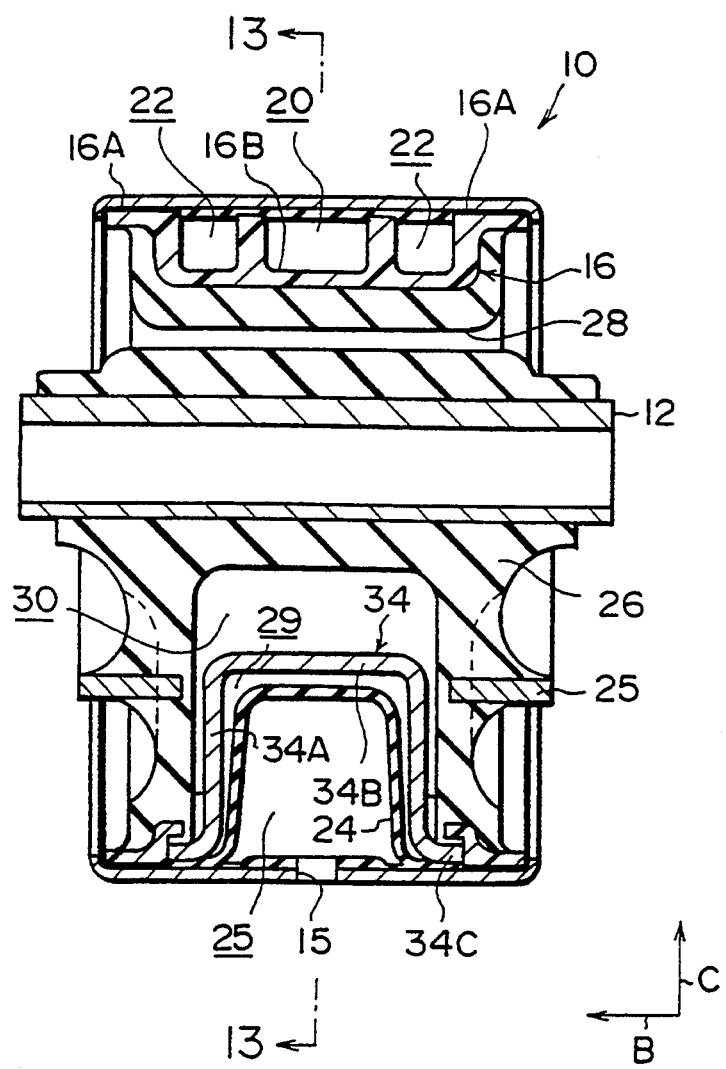
FIG. 13 is a sectional view of a liquid-containing type vibration isolating apparatus relating to a sixth embodiment of the present invention, the view being along an axis of the liquid-containing type vibration isolating apparatus.
Figure 14:
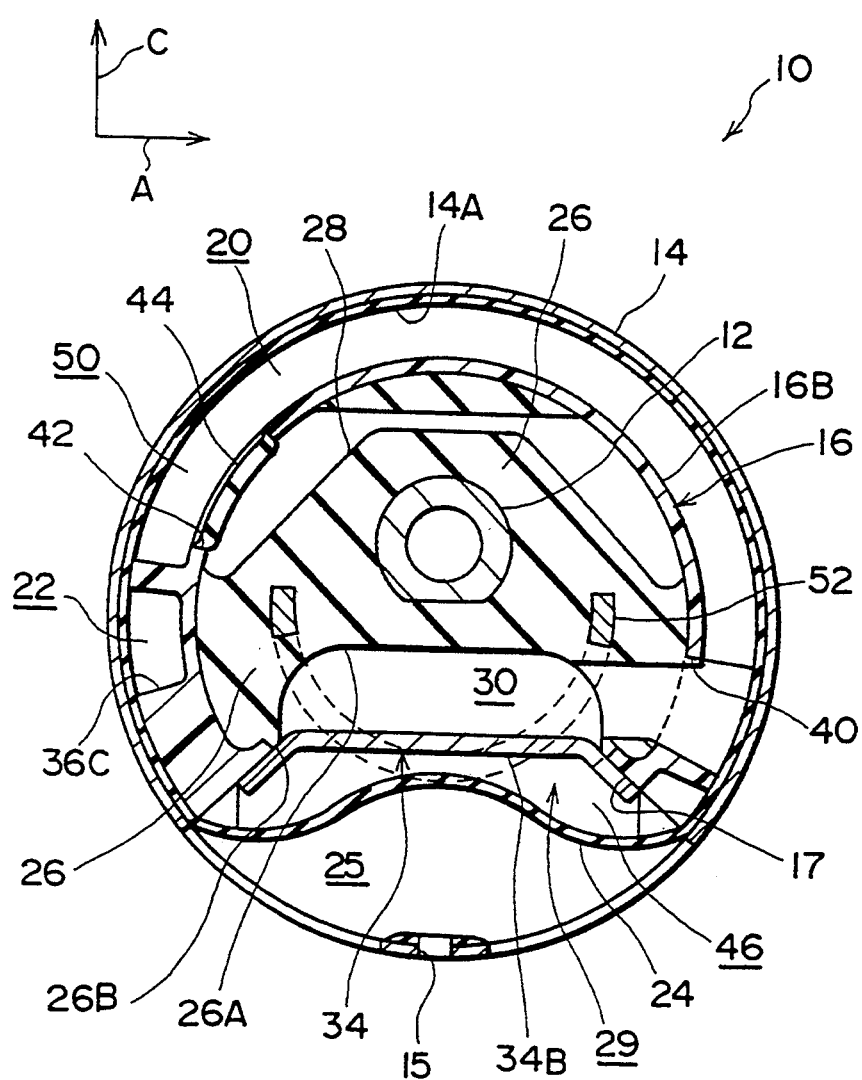
FIG. 14 is a sectional view, taken along line 13—13 of FIG. 13, of the liquid-containing type vibration isolating apparatus relating to the sixth embodiment of the present invention.
Figure 15:
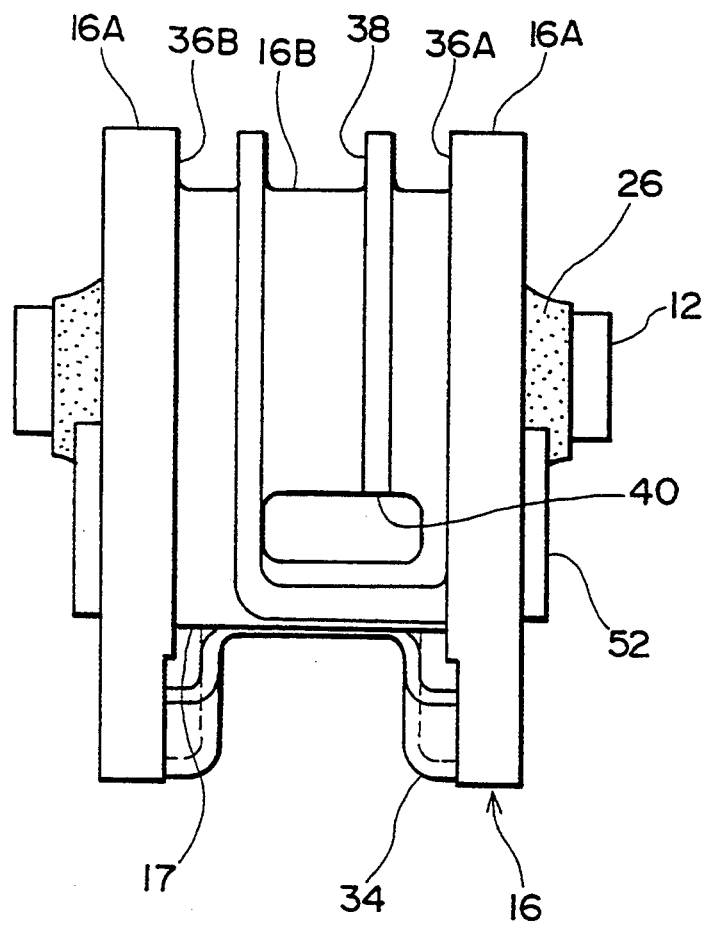
FIG. 15 is a right side view of an intermediate cylinder of the liquid-containing type vibration isolating apparatus relating to the sixth embodiment of the present invention.
Figure 15:
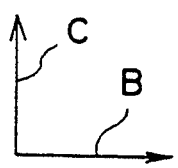
Figure 16:
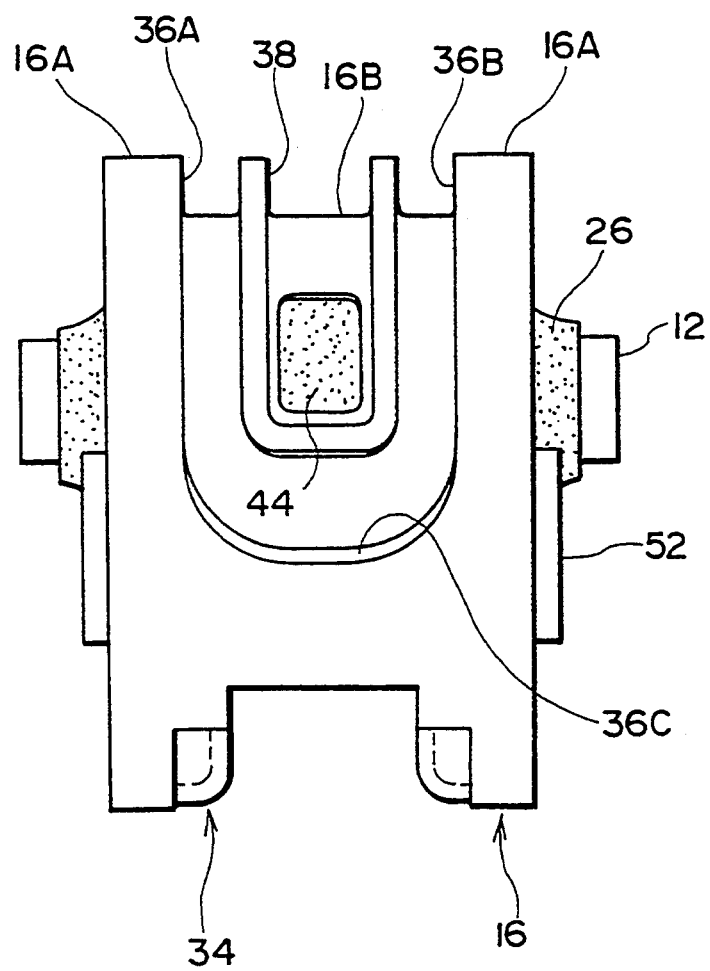
FIG. 16 is a left side view off the intermediate cylinder of the liquid-containing type vibration isolating apparatus relating to the sixth embodiment of the present invention.
Figure 17:
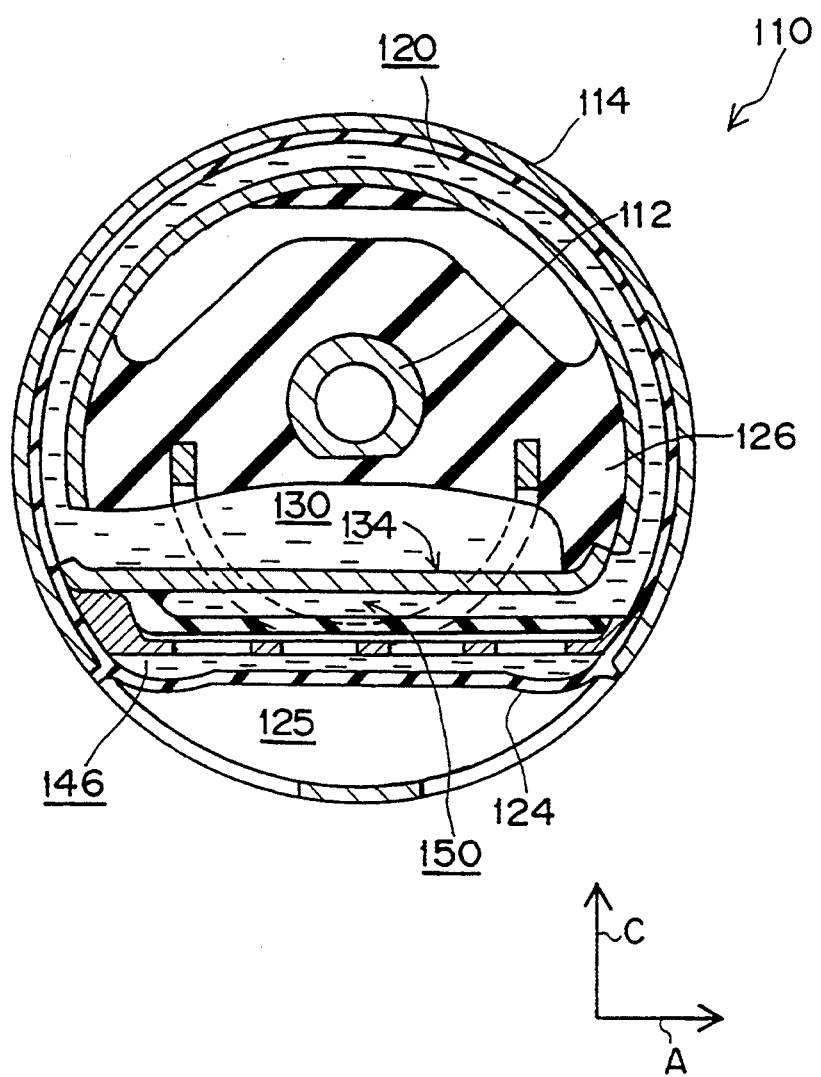
FIG. 17 is a sectional view of a liquid-containing type vibration isolating apparatus relating to a related art of the present invention, the view being orthogonal to an axis of the liquid-containing type vibration isolating apparatus.
Figure 18:
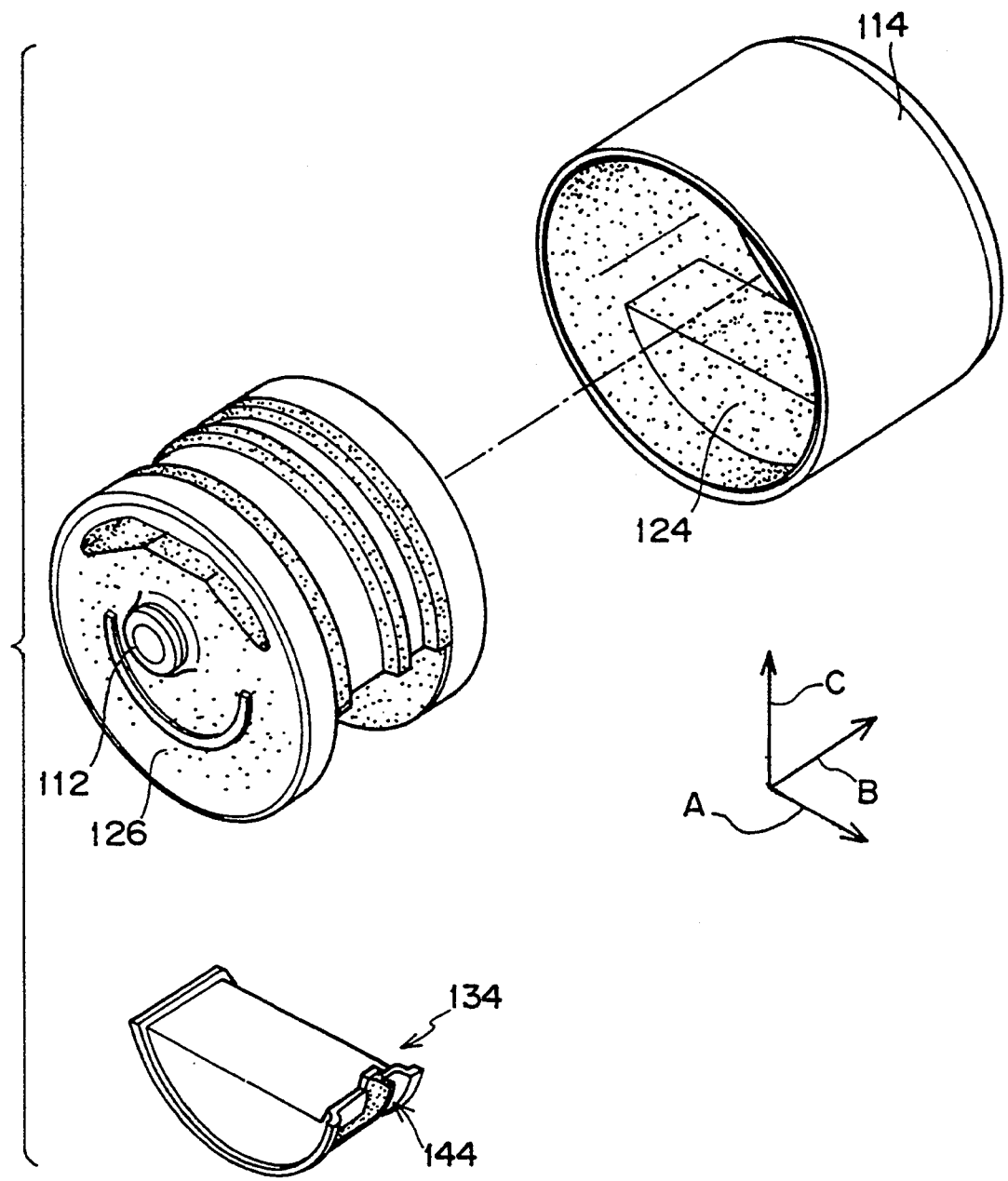
FIG. 18 is an exploded perspective view of a liquid-containing type vibration isolating apparatus relating to a related art of the present invention.

As shown in FIGS. 12, in a liquid-containing type vibration isolating apparatus 10 of the fifth embodiment, thick second diaphragms 44 are provided at the outer cylinder 14 in the liquid-containing type vibration isolating apparatus 10 of the fourth embodiment.

In the fifth embodiment, the liquid-containing type vibration isolating apparatus 10 includes two second diaphragms 44. As a result, it is easier to adjust rigidity of the second sub-liquid chamber 50, and the range over which the characteristic can be adjusted can be increased.

Note that the other structures and operation are the same as those of the first embodiment.

Sixth Embodiment

Next, a sixth embodiment of the present invention will be described in accordance with FIGS. 13 through 16. Structures similar to those of tile first embodiment are designated by the same reference numerals, and descriptions thereof are omitted.

As shown in FIGS. 13 through 16, the intermediate cylinder 16 in the liquid-containing type vibration isolating apparatus 10 of the sixth embodiment is a product formed of a hard material such as an aluminum alloy. The overall configuration of the intermediate cylinder 16 is, for example, a shape in which the intermediate cylinder 16 and the restricting passage forming rubber 18 of the first embodiment are integrated. In the sixth embodiment, the first restricting passage 22 and the second restricting passage 20 are not deformed due to changes in liquid pressure. Changes in the vibration isolating characteristic due to the deformation of the first restricting passage 22 and the second restricting passage 20 can thereby be prevented.

Further, in the above-described embodiments, the liquid-containing type vibration isolating apparatus 10 is used as an engine mount. However, the present invention is not limited to the same, and the liquid-containing type vibration isolating apparatus 10 may be used for a cab mount, a body mount, general industrial machines and the like.

What is claimed is:

1. A liquid-containing type vibration isolating apparatus which absorbs and damps vibrations from a vibration generating portion comprising:

an outer cylinder connected to one of the vibration generating portion and a vibration receiving portion;

an inner cylinder provided at an inner side of said outer cylinder, and connected to another of the vibration generating portion and the vibration receiving portion;

an elastic body provided between said inner cylinder and said outer cylinder, and deforming when vibration is generated;

a pressure-receiving liquid chamber provided between said inner cylinder and said outer cylinder so that said elastic body is a portion of a partitioning wall;

a first sub-liquid chamber which faces a first diaphragm provided at said outer cylinder, said first diaphragm receiving changes in liquid pressure and vibrating;

a second sub-liquid chamber which faces a second diaphragm, said second diaphragm being formed so as to be more rigid than said first diaphragm and receiving changes in liquid pressure and vibrating;

a first restricting passage which connects said pressure-receiving liquid chamber and said first sub-liquid chamber, said first restricting passage being formed by a pair of circumferentially-extending portions, which are separated by a predetermined distance in an axial direction and extend along a circumferential direction, and by a connecting portion, which connects respective circumferential direction end portions of said circumferentially-extending portions; and a second restricting passage which is shorter than said first restricting passage and connects said pressure-receiving liquid chamber and said second sub-liquid chamber, said second restricting passage being provided between said circumferentially-extending portions of said first restricting passage and extending along the circumferential direction.

2. A liquid-containing type vibration isolating apparatus according to claim 1, wherein said connecting portion of said first restricting passage connects the respective circumferential direction end portions of said circumferentially-extending portions in a curved shape.

3. A liquid-containing type vibration isolating apparatus according to claim 2, wherein said second sub-liquid chamber is formed at end portions of said second restricting passage and at a portion adjacent to said connecting portion of said first restricting passage.

4. A liquid-containing type vibration isolating apparatus which absorbs and damps vibrations from a vibration generating portion comprising:

an outer cylinder connected to one of the vibration generating portion and a vibration receiving portion;

an inner cylinder provided at an inner side of said outer cylinder, and connected to another of the vibration generating portion and the vibration receiving portion;

an elastic body provided between said inner cylinder and said outer cylinder, and deforming when vibration is generated;

a pressure-receiving liquid chamber provided between said inner cylinder and said outer cylinder so that said elastic body is a portion of a partitioning wall;

a first sub-liquid chamber which faces a first diaphragm provided at said outer cylinder, said first diaphragm receiving changes in liquid pressure and vibrating;

a second sub-liquid chamber which faces a second diaphragm, said second diaphragm being formed so as to be more rigid than said first diaphragm and receiving changes in liquid pressure and vibrating;

a first restricting passage formed by a pair of circumferentially-extending portions, which are separated by a predetermined distance in an axial direction and extend along a circumferential direction, and by a curved connecting portion, which connects respective circumferential direction end portions of said circumferentially-extending portions in a curved shape, and other circumferential direction end portions of said circumferentially-extending portions communicating with said pressure-receiving liquid chamber and said first sub-liquid chamber, respectively; and a second restricting passage which is provided between said circumferentially-extending portions of said first restricting passage and extends along the circumferential direction, end portions of said second restricting passage communicating with said pressure-receiving liquid chamber and said second sub-liquid chamber, respectively.

5. A liquid-containing type vibration isolating apparatus according to claim 4, wherein said second sub-liquid chamber is a portion surrounded by said circumferentially-extending portions and said curved connecting portion of said first restricting passage, and is formed at end portions of said second restricting passage.

6. A liquid-containing type vibration isolating apparatus which absorbs and damps vibrations from a vibration generating portion comprising:

an outer cylinder connected to one of the vibration generating portion and a vibration receiving portion;

an intermediate cylinder provided at an inner circumference of said outer cylinder and fixed to said outer cylinder;

an inner cylinder provided at an inner side of said intermediate cylinder, and connected to another of the vibration generating portion and the vibration receiving portion;

an elastic body provided between said inner cylinder and said intermediate cylinder, and deforming when vibration is generated;

a pressure-receiving liquid chamber provided between said inner cylinder and said intermediate cylinder so that said elastic body is a portion of a partitioning wall;

a first sub-liquid chamber which faces a first diaphragm provided at said outer cylinder, said first diaphragm receiving changes in liquid pressure and vibrating;

a second sub-liquid chamber which faces a second diaphragm, said second diaphragm receiving changes in liquid pressure and vibrating;

a first restricting passage formed by a pair of circumferentially-extending portions, which are separated by a predetermined distance in an axial direction and extend along a circumferential direction, and by a curved connecting portion, which connects respective circumferential direction end portions of said circumferentially-extending portions in a curved shape, and other circumferential direction end portions of said circumferentially-extending portions communicating with said pressure-receiving liquid chamber and said first sub-liquid chamber, respectively; and a second restricting passage which is provided between said circumferentially-extending portions of said first restricting passage and extends along the circumferential direction, end portions of said second restricting passage communicating with said pressure-receiving liquid chamber and said second sub-liquid chamber, respectively.

7. A liquid-containing type vibration isolating apparatus according to claim 6, wherein said second diaphragm is provided at said intermediate cylinder.

8. A liquid-containing type vibration isolating apparatus according to claim 6, wherein said first and second restricting passages are formed between said intermediate cylinder and said outer cylinder.

9. A liquid-containing type vibration isolating apparatus according to claim 7, wherein said first and second restricting passages are formed between said intermediate cylinder and said outer cylinder.

10. A liquid-containing type vibration isolating apparatus according to claim 6, wherein said second diaphragm is provided at said outer cylinder.

11. A liquid-containing type vibration isolating apparatus according to claim 6, wherein said second sub-liquid chamber is a portion surrounded by said circumferentially-extending portions and said curved connecting portion of said first restricting passage, and is formed at end portions of said second restricting passage.

12. A liquid-containing type vibration isolating apparatus according to claim 6, further comprising:
a partitioning wall member provided between said pressure-receiving liquid chamber and said first sub-liquid chamber such that said pressure-receiving liquid chamber and said first sub-liquid chamber oppose each other.

13. A liquid-containing type vibration isolating apparatus according to claim 6, wherein said second diaphragm is formed so as to be more rigid than said first diaphragm.

14. A liquid-containing type vibration isolating apparatus according to claim 6, wherein said second diaphragm is formed so as to be thicker than said first diaphragm.

15. A liquid-containing type vibration isolating apparatus according to claim 6, wherein said elastic body and said second diaphragm are vulcanized simultaneously.

16. A liquid-containing type vibration isolating apparatus according to claim 6, wherein said second restricting passage is formed so as to be wider than said first restricting passage so that said second restricting passage is used for absorbing high-frequency vibration and said first restricting passage is used for absorbing low-frequency vibration.

17. A liquid-containing type vibration isolating apparatus according to claim 6, wherein said outer cylinder is mounted to a vehicle body of an automobile, which serves as the vibration receiving portion, and said inner cylinder is mounted to an engine, which serves as the vibration generating portion.

18. A liquid-containing type vibration isolating apparatus according to claim 6, wherein said second restricting passage is comprised of a hard material.

19. A liquid-containing type vibration isolating apparatus according to claim 6, wherein said intermediate cylinder is comprised of a hard material and includes grooves which form said first restricting passage and said second restricting passage.

20. A liquid-containing type vibration isolating apparatus according to claim 10, wherein said first diaphragm and said second diaphragm are symmetrically disposed with respect to a diameter of a surface which is orthogonal to an axis of said outer cylinder.

21. A liquid-containing type vibration isolating apparatus which absorbs and damps vibrations from a vibration generating portion comprising:

an outer cylinder connected to one of the vibration generating portion and a vibration receiving portion;

an intermediate cylinder provided at an inner circumference of said outer cylinder and fixed to said outer cylinder;

an inner cylinder provided at an inner side of said intermediate cylinder, and connected to another of the vibration generating portion and the vibration receiving portion;

an elastic body provided between said inner cylinder and said intermediate cylinder, and deforming when vibration is generated;

a pressure-receiving liquid chamber provided between said inner cylinder and said intermediate cylinder so that said elastic body is a portion of a partitioning wall;

a first sub-liquid chamber which faces a first diaphragm provided at said outer cylinder, said first diaphragm receiving changes in liquid pressure and vibrating;

a second sub-liquid chamber which faces second diaphragms, said second diaphragms being respectively provided at specific portions of said outer cylinder and said intermediate cylinder where said outer cylinder and said intermediate cylinder oppose each other, said second diaphragms being formed so as to be more rigid than said first diaphragm and receiving changes in liquid pressure and vibrating;

a first restricting passage formed between said outer cylinder and said intermediate cylinder, said first restricting passage being formed by a pair of circumferentially-extending portions, which are separated by a predetermined distance in an axial direction and extend along a circumferential direction, and by a curved connecting portion, which connects respective circumferential direction end portions of said circumferentially-extending portions in a curved shape, and other circumferential direction end portions of said circumferentially-extending portions respectively communicating with said pressure-receiving liquid chamber and said first sub-liquid chamber;

a second restricting passage formed between said outer cylinder and said intermediate cylinder, said second restricting passage being provided between said circumferentially-extending portions of said first restricting passage and extending along the circumferential direction, end portions of said second restricting passage respectively communicating with said pressure-receiving liquid chamber and said second sub-liquid chamber.

22. A liquid-containing type vibration isolating apparatus according to claim 21, wherein said second sub-liquid chamber is a portion surrounded by said circumferentially-extending portions and said curved connecting portion of said first restricting passage, and is formed at end portions of said second restricting passage.

* * * * *